(12) United States Patent
Grigg et al.

(10) Patent No.: US 8,571,985 B1
(45) Date of Patent: Oct. 29, 2013

(54) RECONCILING A MERCHANT OF RECORD IN A MOBILE WALLET FEATURE

(75) Inventors: David M. Grigg, Rock Hill, SC (US); Elizabeth S. Votaw, Potomac, MD (US); Peter John Bertanzetti, Charlotte, NC (US); Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/536,243

(22) Filed: Jun. 28, 2012

(51) Int. Cl.
  *G06Q 40/00* (2012.01)
(52) U.S. Cl.
  USPC .................................. 705/40; 705/35; 705/39
(58) Field of Classification Search
  USPC ................................................ 705/35, 39, 40
  See application file for complete search history.

(56) References Cited

U.S. PATENT DOCUMENTS

| | | | |
|---|---|---|---|
| 2004/0049455 A1* | 3/2004 | Mohsenzadeh | ................. 705/40 |
| 2007/0034682 A1 | 2/2007 | Williams | |
| 2009/0248538 A1 | 10/2009 | Taylor | |
| 2010/0057786 A1 | 3/2010 | Hardy-McGee | |
| 2010/0133335 A1 | 6/2010 | Maguid et al. | |
| 2010/0257033 A1 | 10/2010 | Roberts et al. | |
| 2011/0137928 A1 | 6/2011 | Engle et al. | |
| 2011/0276417 A1 | 11/2011 | Campbell et al. | |
| 2012/0030110 A1* | 2/2012 | Prakash et al. | ................. 705/44 |
| 2012/0036042 A1 | 2/2012 | Graylin et al. | |

* cited by examiner

*Primary Examiner* — Lalita M Hamilton
(74) *Attorney, Agent, or Firm* — Michael A. Springs; Moore & Van Allen PLLC; Esther F. Queen

(57) ABSTRACT

Systems and methods for reconciling merchant of record in a mobile wallet feature are provided herein. In mobile transactions, the reported merchant of record is often a provider of the mobile wallet feature and not the merchant of interest to the user. The systems and methods identify mobile payments based on the transaction data, the mobile payments comprising a merchant of record, wherein the merchant of record includes a provider of the mobile wallet feature; compare the mobile payments and the identification data of the unrecorded merchant; match the unrecorded merchant with at least one payment of the mobile payments in response to the comparison of the mobile payments and the identification data; and identify the unrecorded merchant based on the identification data.

19 Claims, 8 Drawing Sheets

RECONCILING A MERCHANT OF RECORD IN A MOBILE WALLET FEATURE

BACKGROUND

In recent years, the number of transactions that use mobile wallet applications has increased due to the convenience and security of such payment methods. Users of mobile wallet applications, however, often find it difficult to keep track of their mobile payments, including the merchants to which the payments were made for the goods or services.

BRIEF SUMMARY

The embodiments provided herein are directed to a system for reconciling merchants of record in a mobile wallet feature. The system includes: a computer apparatus including a processor and a memory; and a merchant identification software module stored in the memory, comprising executable instructions that when executed by the processor cause the processor to: receive transaction data comprising identification data of an unrecorded merchant that is a party to one or more transactions; identify mobile payments based on the transaction data, the mobile payments comprising a merchant of record, wherein the merchant of record comprises a provider of the mobile wallet feature; compare the mobile payments and the identification data of the unrecorded merchant; match the identification data with at least one payment of the mobile payments in response to the comparison of the mobile payments and the identification data; and identify the unrecorded merchant based on the identification data.

In some embodiments of the system, the module is further configured to: receive purchase data from a user; compare the purchase data and the at least one payment; and identify inconsistencies between the purchase data and the at least one payment; and notify the user of the inconsistencies. The module can be further configured to: identify a purchase trend based on the transaction data; compare the purchase trend and the at least one payment; and determine that the at least one payment is inconsistent with the purchase trend. The module can be further configured to: provide a notification to a user, wherein the notification comprises the at least one payment and the identified unrecorded merchant. In some embodiments, the identification data of the unrecorded merchant is received from the provider of the mobile wallet feature, the unrecorded merchant, or from a user.

In other embodiments of the system, the identification data comprises first identification data received from the provider of the mobile wallet feature and second identification data received from the unrecorded merchant. The module can be further configured to: receive account data from the unrecorded merchant; compare the second identification data and account data of the unrecorded merchant; and determine the identity of the unrecorded merchant in response to the comparison of the second identification data and the account data. The module can be further configured to: receive location information of a mobile device that is in communication with the system; determine the period of time associated with the location information; identify at least one transaction of the mobile payments that occur during the period of time; and identify one or more merchants associated with the location information, wherein the one or more merchants is a party to the at least one transaction. The module can be further configured to: receive quick response code associated with the unrecorded merchant or an image of a logo associated with the unrecorded merchant from a mobile device that is in communication with the system; and identify the unrecorded merchant based on the quick response code or the image of the logo.

In some embodiments, a method for reconciling merchants of record in a mobile wallet feature is provided. The method includes: receiving transaction data comprising identification data of an unrecorded merchant that is a party to one or more transactions; identifying, via a computing device processor, mobile payments based the transaction data, the mobile payments comprising a merchant of record, wherein the merchant of record comprises a provider of the mobile wallet feature; comparing, via a computing device processor, the mobile payments and the identification data of the unrecorded merchant; matching, via a computing device processor, the identification data with at least one payment of the mobile payments in response to the comparison of the mobile payments and the identification data; and identifying, via a computing device processor, the unrecorded merchant based on the identification data.

In some embodiments of the method, the identification data comprises first identification data received from the provider of the mobile wallet feature and second identification data received from the unrecorded merchant. The method can further include: receiving account data from the unrecorded merchant; comparing, via a computing device processor, the second identification data and account data of the unrecorded merchant; determining, via a computing device processor, the identity of the unrecorded merchant in response to the comparison of the second identification data and the account data; and matching, via a computing device processor, the identified unrecorded merchant with at least one of the mobile payments. The method can further include: receiving location information of a mobile device that is in communication with the system; determining, via a computing device processor, the period of time associated with the location information; identifying, via a computing device processor, at least one transaction of the mobile payments that occur during the period of time; identifying, via a computing device processor, one or more merchants associated with the location information, wherein the one or more merchants is a party to the at least one transaction.

Also provided in the embodiments presented herein is a computer program product for reconciling merchants of record in a mobile wallet feature. The computer program product includes: a computer readable storage medium having computer readable program code embodied therewith, the computer readable program code comprising: a computer readable program code configured to receive transaction data comprising identification data of an unrecorded merchant that is a party to one or more transactions; a computer readable program code configured to identify mobile payments based on the transaction data, the mobile payments comprising a merchant of record, wherein the merchant of record comprises a provider of the mobile wallet feature; a computer readable program code configured to compare the mobile payments and the identification data of the unrecorded merchant; a computer readable program code configured to match the identification data with at least one payment of the mobile payments in response to the comparison of the mobile payments and the identification data; and a computer readable program code configured to identify the unrecorded merchant based on the identification data.

In some embodiments of the computer program product, the computer program product further includes a computer readable program code configured to receive location information of a mobile device that is in communication with the system; to determine the period of time associated with the location information; to identify at least one transaction of the mobile payments that occur during the period of time; and to identify one or more merchants associated with the location information, wherein the one or more merchants is a party to the at least one transaction. The computer program product can further include computer readable program code configured to receive purchase data from a user; to compare the purchase data and the at least one payment; to identify inconsistencies between the purchase data and the at least one payment; and to notify the user of the inconsistencies. The computer program product can further include a computer readable program code configured to replace the merchant of record with the identified unrecorded merchant.

In some embodiments of the computer program product, the computer program product further includes a computer readable program code configured to identify a purchase trend based on the transaction data; compare the purchase trend and the at least one payment; and identify inconsistencies between the purchase trend and the at least one payment. In other embodiments of the computer program product, the computer program product further includes a computer readable program code configured to provide a notification to a user, the notification comprises the at least one payment and the identified unrecorded merchant. In some embodiments of the computer program product, the identification data comprises first identification data received from the provider of the mobile wallet feature and second identification data received from the unrecorded merchant.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1A:
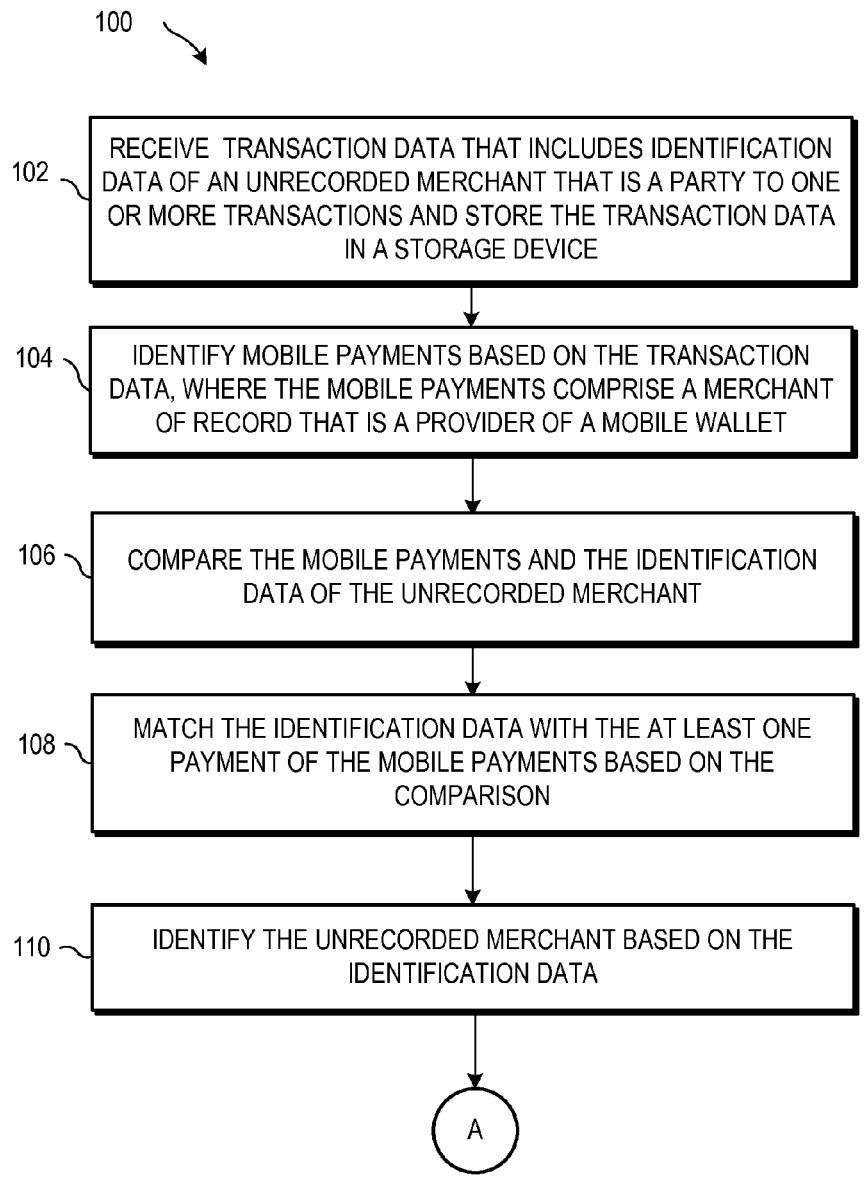
FIG. 1A is a flowchart illustrating a method for reconciling merchants associated with mobile payments in accordance with various embodiments of the invention.

The embodiments presented herein are directed to systems and methods for reconciling merchants of record in a mobile wallet feature. The company maintaining the mobile wallet feature can be designated as the merchant of record when the mobile payments are processed thereby obscuring the merchant name associated with the payment. As a result, the user may not be able to identify potential issues such as mobile payment misuse and incorrect mobile payment charges. The missing data can negatively affect the user's finances and greatly inconvenience the user. The systems and methods described herein receive transaction data that includes identification data of the merchant that is party to the transaction and uses the data to identify the merchant and match the identified merchant to a mobile payment. The embodiments of the invention reconcile the merchant of record and notify the user of the merchant's identity. In this way, the user can easily track mobile payments and identify any potential issues with the payments.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments of the invention that reconcile merchants of record by identifying merchants that are a party to mobile payment transactions are provided. In some of the embodiments, the provider of the mobile wallet feature and not the merchant of interest is designated as the merchant of record for one or more mobile payments. Because the provider of the mobile wallet application is listed as the merchant of record of the transaction, users may not be able to later match the actual merchant with purchases made using a mobile wallet. The embodiments of the invention provide the user with at least some or all of the merchant information.

Figure 1B:
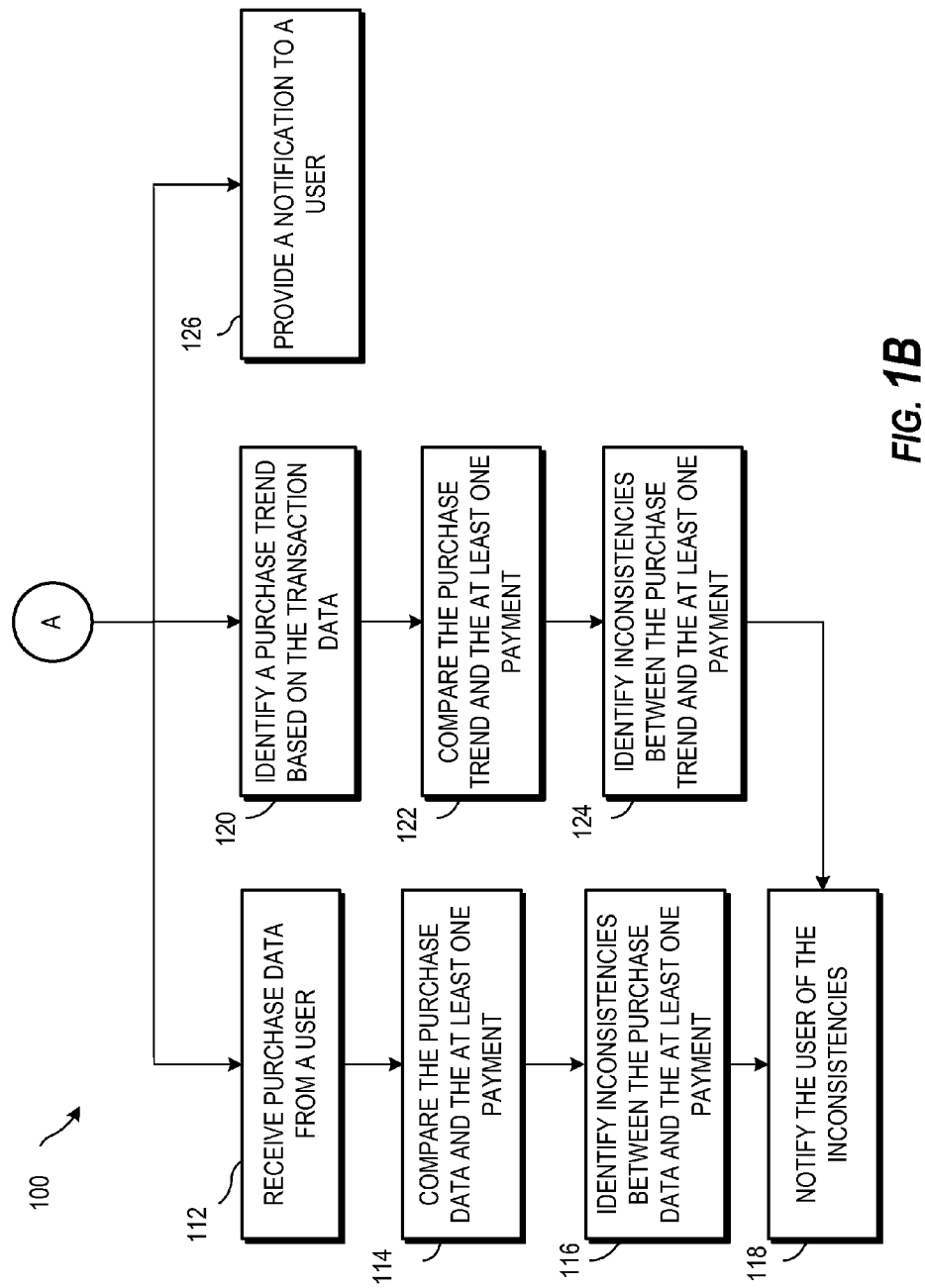
FIG. 1B is a continuation of the flowchart from FIG. 1A illustrating a method for reconciling merchants associated with mobile payments in accordance with various embodiments of the invention.

FIGS. 1A-1B are flowcharts providing an overview of a method 100 for reconciling merchants associated with mobile payments. One or more devices, such as one or more mobile devices and/or one or more other computing devices and/or servers, can be configured to perform one or more steps of the method 100. In some embodiments, the one or more devices performing the steps are associated with a financial institution. In other embodiments, the one or more devices performing the steps are associated with a business, partner, third party, and/or user.

As shown in FIG. 1A, and as illustrated at block 102, the system receives transaction data that includes identification data of an unrecorded merchant that is a party to one or more transactions and stores the transaction data in a storage device (e.g., the user account data repository 580, the merchant identification datastore 470, or another databases). A used herein, "transaction data" includes, but is not limited to any data associated with one or more financial accounts such as transaction amounts, inbound transactions, outbound transactions, transaction channels, transaction dates, identification of third parties to a transaction, payee names, purpose of transactions, transaction transfer data, types of accounts, terms of an account, terms of a transaction, identification of products or services purchased, transaction costs, account costs, merchant based or product based promotions, rewards associated with an account, and the like. The transaction data may be received from a user, merchants, other financial institutions such as credit card companies, providers of a mobile wallet feature, or any other entity. For example, the transaction data may be communicated from a point of sales (POS) device of a merchant, a system of a mobile wallet provider, and/or a mobile device of a user.

Exemplary identification data includes merchant codes, POS identification codes, merchant location information (e.g., merchant addresses or store code), mobile device location information, internal merchant account data, merchant logos, quick response (QR) code associated with a merchant, receipt data, transaction identifier, and the like. In some embodiments, the identification data comprises first identification data received from the provider of the mobile wallet feature, second identification data received from the unrecorded merchant, and/or third identification data received from the user. In some embodiments, the unrecorded merchant inserts the identification data in a space of the transaction data.

In other embodiments, the user using a mobile device tags certain transactions and sends the tagged transaction data to the system. For example, the user using the mobile device may scan QR code at a point of sale or generate an image of a merchant logo to tag the transaction and send the tagged transaction to the system. As another example, the user may capture an image of a receipt associated with a transaction and link the image of the receipt to the transaction. In such cases, the system can use the receipt data to identify the merchant and also process, or aid the user in processing returns of purchased items, disputes, and the like. The system can also use the receipt information to provide the user with further information regarding the transaction such as a description of purchased items, the price of each item, discount or sales information, rewards, and the like. The user may also, for example, provide other information to the system to associate a particular transaction with audio and/or visual data. For example, the user may generate annotations for a transaction such as voice, video, or text data that can be tagged to the transaction. Exemplary annotations include user transaction notes, product reviews, product commercials, merchant advertisements, and the like.

In still another example, a global positioning system (GPS) feature on the user's mobile device can be used to identify the location of the mobile device at the point of sale and the mobile device can send the location to the system. In yet another example, the system provides the user with a list of merchants. The system generates, in some embodiments, the list of merchants based on previous transactional data associated with the user such as past identified merchants or a transaction history associated with a particular credit card account. The user may easily select a particular merchant at the point of sales from a list of merchants provided to the user on the display of the user's mobile device such that the merchant is linked to a particular transaction.

As illustrated in block 104, the system identifies mobile payments based on the transaction data, where the mobile payments comprise a merchant of record that is a provider of a mobile wallet. In some embodiments, the merchant of record is not a merchant that offers and/or sells the products and/or services that the user intends to purchase. The merchant of record, for example, may be a business that maintains the mobile wallet, a credit card company, a wireless carrier, and the like. For example, the listing of the merchant of record may merely provide the user with an identification of the type of payment method used and not provide an identification of the actual merchant. In one particular example, the merchant of record is a provider of the mobile wallet feature and is not a party to the transaction. The provider of the mobile wallet application, for example, does not receive funds from a user in exchange for products or services offered in a purchase transaction. The merchant of record, in some embodiments, may receive an amount associated with the transaction. For example, a provider of a mobile wallet feature or other business may receive a set amount from the merchant that is a party to the transaction and/or user for every mobile wallet transaction. The set amount may be a portion of the transaction amount for the mobile wallet transaction or a defined cost. The provider of the mobile wallet feature may also receive the set amount per period of time (e.g., every month). In other embodiments, the merchant of record comprises an indirect provider or a third party that acts as an intermediary for the merchant that provides the products or services purchased by the user.

Algorithms, rules, keywords, Boolean, and other search logic can be used to search the transaction data to identify the mobile payments. Keywords may include certain business names, web addresses, symbols (e.g., $), merchant codes, transaction codes, account codes, and the like. Although the embodiments described herein are directed to mobile transactions using a mobile wallet on a mobile device, it will be understood that other transactions and transaction channels may be included in the embodiments such as bank card purchases, check purchases, or any other transaction that lacks full disclosure.

As illustrated in block 106, the system compares the mobile payments and the identification data of the unrecorded merchant. The unrecorded merchant includes businesses, such as online companies, virtual companies, or physical stores that are not identified in the record of the transaction. For example, the financial institution that processes the transaction may not receive merchant identification information and cannot therefore provide such identifying information to the user. In some embodiments, the unrecorded merchant includes a merchant that provides and/or sells the products or items the user purchases. For example, the unrecorded merchant may be a brick and mortar store that sells products that the user purchases at a POS device operated by a merchant. In other embodiments, the unrecorded merchant includes merchants that ask for and receive payment for services and/or products. For example, the unrecorded merchant may be a third party, partner, parent company, or agent that processes payments on behalf of a business that sells products and services to the user.

As illustrated in block 108, the system matches the identification data with the at least one payment of the mobile payments based on the comparison. In some embodiments, the identification data is separate from the transaction data associated with the mobile payments. For example, the identification data and the transaction data associated with the mobile payments may be sent at different times or the identification data may not be linked to the mobile payment data. In some embodiments, the system matches one or more elements of the identification data with one or more elements of the at least one payment. The system may, in one example, match the date and time that an image of a merchant logo was received with the same or similar date and time of a particular mobile payment. In some embodiments, the system receives location data from a mobile device of the user in real time. The system determines the time and date the location data is received and identifies mobile payments that occur during the same or approximately the same time and date. In another example, the system may match the location information of a mobile device with merchants in the geographical area provided by the location information that are capable of processing mobile payments. In still another example, the system may match a particular amount that is credited or debited to an internal account of a merchant to a mobile payment that corresponds to the same particular credit or debit amount.

In other embodiments, the identification data is associated with the mobile payment data. For example, the user may tag mobile payments with the identification data or the unrecorded merchant may include the identification data with the mobile payment data. The system may confirm that the identification data is associated with a particular mobile payment. For example, the system may determine that the location information received from a mobile device is incorrect by determining that no merchants are located in the geographical area associated with the location information. The GPS device may be off center, for example, and report the location of a nature reserve that has no businesses located at the reserve rather than the location of a merchant's store located a few miles from the nature reserve. The system may seek location correction or confirmation from the user and/or identify merchants closest to the nature reserve. As another example, the system may determine that internal merchant code received from the unrecorded merchant does not match any internal account or that merchant code sent by the mobile wallet provider is corrupt and indecipherable. In such cases, the system may ask for additional information or use other identification data to link to the at least one payment. In a particular example, the system may prompt the user to confirm a proposed merchant assigned to a particular transaction, or otherwise require the user to select a merchant for a transaction from a group of merchants.

As illustrated in block 110, the system identifies the unrecorded merchant based on the identification data. For example, merchants that are associated with a financial institution may send internal codes to the financial institution's system along with a transaction and the system may match the internal code to the account of the merchant in order to identify the merchant. In another example, the system matches a QR code and/or a logo tagged to the at least one payment to identify the unrecorded merchant.

The system in some embodiments may further identify one or merchants associated with the location information. For example, the system may match a merchant's address with the location information of the mobile device. In cases where location information corresponds to an address that includes many merchants such as a mall, building, or shopping center, the system may identify the name of the mall, building, or shopping center. The system, in other cases, may determine that the user has shopped at a particular store in the mall in the past or use data provided by the user to narrow the possible merchants down to one or a few.

In further embodiments, the system identifies the unrecorded merchant based on purchase trends. Purchase trends, as described herein, indicate patterns of transactions or account activity. Exemplary purchase trends include changes in transaction amounts, changes in account activity such as a decrease or increase in the number of transactions or the amount of transactions during a certain period of time, transaction locations associated with various parameters such as particular merchants, periods of time, or amounts, and other patterns of account activity. For example, the system may determine that the user has paid $3.89 to a particular merchant for a cup of coffee before 10 am and on every week day of the past four months based on the user's credit card data. Based on this trend, the system can identify the unrecorded merchant for a mobile payment as the particular merchant based on, for example, the time of the payment, day of the week the transaction occurred, and/or the amount of the payment. Although the embodiments described herein are directed to the reconciliation of the merchant of record, the embodiments may further provide identification and reconciliation of other information associated with a particular transaction such as the identity of items purchased, the number of items purchases, transaction costs, transaction amounts, and the like.

The method 100 is further illustrated in FIG. 1B. As illustrated in block 112, the system receives purchase data from a user. Exemplary purchase data includes the user defined information, the total amount of the purchase, the cost of one or more of the items purchase, the sale price of one or more items purchased, the identity of the items purchased, the location of the purchase, the identity of the merchant, date and time of the purchase, and any other information associated with the purchase. As illustrated in blocks 114 and 116, the system 100 compares the purchase data and the at least one payment and identifies inconsistencies between the purchase data and the at least one payment. For example, the system may compare the identity of the merchant in the purchase data and the identified unrecorded merchant to determine if the identities are the same. As described herein, inconsistencies include but are not limited to one or more elements of data that are inconsistent or discrepant with one or more elements of another set of data. Exemplary inconsistencies include inconsistencies in merchant identifications, point of sale locations, online websites associated with mobile payments, times and dates, items purchased, transaction amounts, and the like.

As illustrated in block 118, the system notifies the user of the inconsistencies. For example, the user may be immediately and automatically notified by text, email, or phone message upon determination of the inconsistencies, or the inconsistencies may be reported in a monthly bank statement. In some embodiments, the system receives a response from the user. For example, the user may verify the inconsistencies, correct the inconsistencies by modifying the purchase data and/or the identity of the unrecorded merchant, and/or ask for more information. The system can update the transaction data, stop payment, and/or initiate a dispute proceeding with a merchant based on the user's response. In some embodiments, the system creates exception rules based on user input. The user input may include alert preferences, merchant exceptions, transaction amount thresholds, and the like.

As illustrated in blocks 120-124, the system identifies a purchase trend based on the transaction data, compares the purchase trend and the at least one payment, and identifies inconsistencies between the purchase trend and the at least one payment. For example, if the system determines that cash was withdrawn from an automated teller machine in a first location using a user's debit card at a particular period of time and that the at least one payment took place at a second location during the same period of time, the system may report an inconsistency to the user. In another example, the system may determine that credit card purchases for transportation have not exceeded a particular threshold (e.g., $10 for bus fare) during the last six months and that a mobile payment of $55 at a bus terminal is inconsistent with the purchase trend.

As illustrated in block 126, the system provides a notification to a user. In some embodiments, the notification comprises the identified unrecorded merchant, the at least one payment, and/or additional information. For example, the additional information may include the merchant's contact information, the identity of the items purchased, and the like. Exemplary notifications include an account statement, an email, a text, or an audio message. In some embodiments, the identified unrecorded merchant replaces the provider of the mobile wallet feature as the merchant of record. In instances where the provider of the mobile wallet is replaced, the system can, for example, further include an identifier that tags the transaction as being a mobile payment. In other embodiments, the system adds the identified unrecorded merchant to the notification. For example, the record of the at least one payment may include the original merchant of record as well as the identified unrecorded merchant. Although the merchant of record is a provider of a mobile wallet feature in the illustrated embodiments, it will be understood that the merchant of record may include any merchant that is not the merchant of interest or any merchant that is not a party to a particular transaction.

Figure 2:
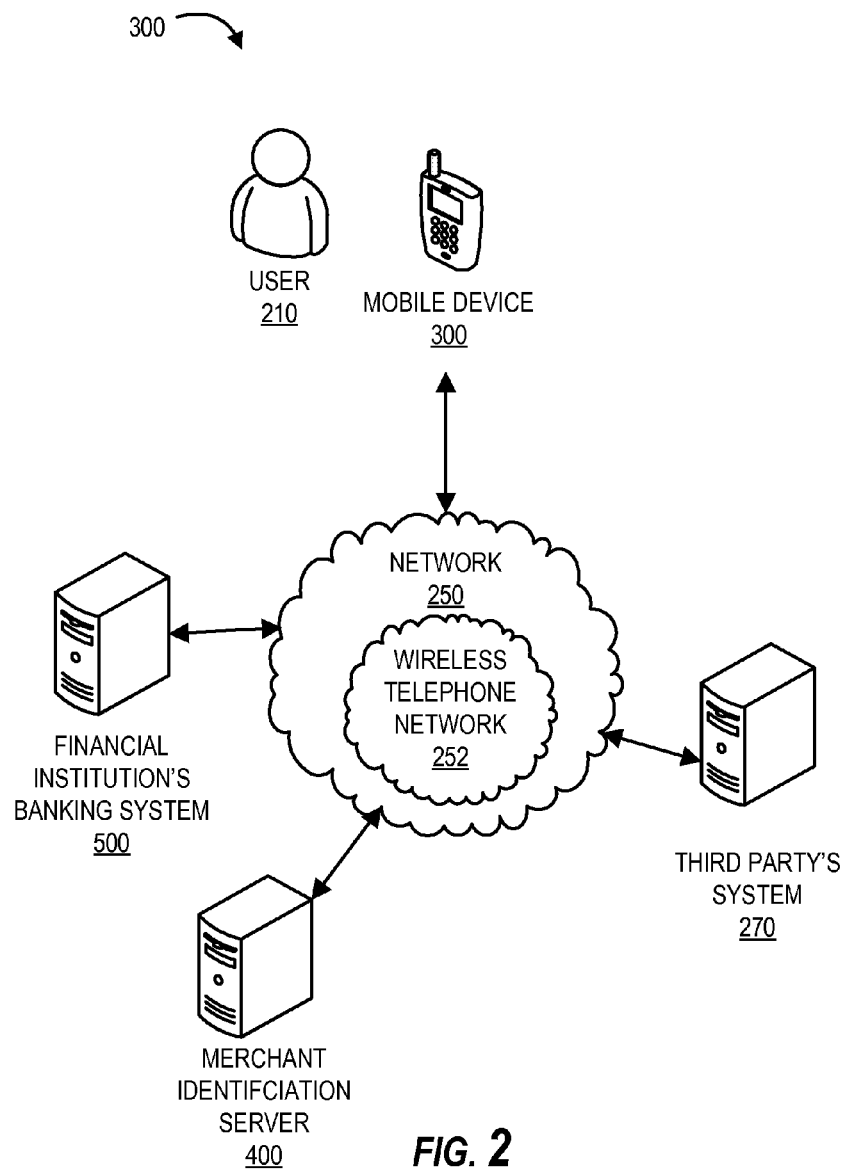
FIG. 2 is a merchant reconciliation system and environment in accordance with various embodiments of the invention.

FIG. 2 provides a block diagram illustrating a merchant reconciliation system and environment 200, in accordance with an embodiment of the invention. As illustrated in FIG. 2, the environment 200 includes the user 210 and the user's mobile device 300. As used herein, a "mobile device" 300 is any mobile device, such as a cellular telecommunications device (e.g., a cell phone, mobile phone, smart phone, etc.), personal digital assistant (PDA), a mobile Internet accessing device, or other mobile device. In some embodiments, the mobile device 300 employs a processor and memory and can perform computing functions.

The mobile device 300 is configured to communicate over a network 250 with the financial institution's banking system 500 and, in some cases, a third party's system 270. The third party's system 270 includes systems associated with a merchant, a mobile wallet provider, third party financial institutions, and/or other third parties. The network 250 may include a local area network (LAN), a wide area network (WAN), and/or a global area network (GAN). The network 250 may provide for wireline, wireless, or a combination of wireline and wireless communication between devices in the network. In one embodiment, the network 250 includes the Internet. In one embodiment, the network 250 includes a wireless telephone network 252. In further embodiments, the network 250 includes a near field communication (NFC) network.

In general, the mobile device 300 is configured to connect with the network 250 to log the user 210 into the banking system 500. In some embodiments, the banking system 500 involves authentication of the user in order to access the user's account on the banking system 500. For example, the banking system 500 may be a system where the user 210 logs into his/her account such that the user 210 or other entity can access data that is associated with the user 210. In some embodiments, the banking system 500 is a mobile banking system maintained by a financial institution. In such an embodiment, the user 210 can use the mobile device 300 to log into the mobile banking system to access the user's financial accounts. Logging into the banking system 500 generally requires that the user 210 authenticate his/her identity using a user name, a passcode, a cookie, a biometric identifier, a private key, a token, and/or another authentication mechanism that is provided by the user 210 to the banking system 500. In some embodiments, the user logs into his or her account via a mobile wallet application stored on the use's mobile device.

The financial institution's banking system 500 is in network communication with other devices, such as the third party's systems 270, a merchant identification server 400, and a point of sales device (not shown) that is configured to communicate with the network 250 to log a merchant into the banking system 500. In some embodiments, the system and environment 200 includes a point-of-sale device that is Near-Field Communication (NFC) enabled, a wireless enabled device and/or another type of device capable of communicating with the mobile device 300 of the user 210. In an embodiment, the point-of-sale device includes a NFC chip capable of syncing with and/or communicating with another NFC chip in the vicinity of the point-of-sale device. In a further embodiment, the point-of-sale device is network-enabled and able to communicate with the user's device 300 over a wireless network or via Bluetooth™. In another embodiment, the point-of-sale device communicates with the banking system 500, which in turn communicates the mobile device 300, and thus communication is enabled between all devices on the network 250 through relays.

Figure 3:
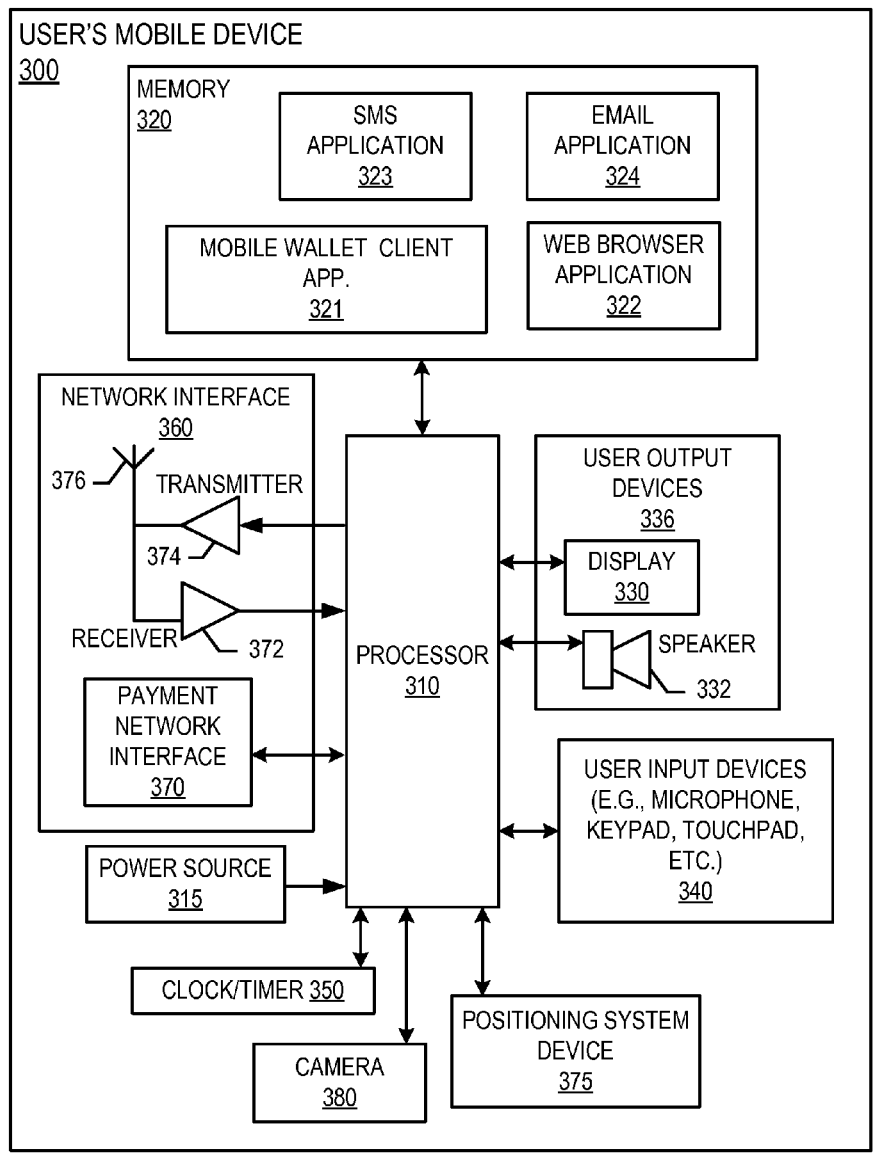
FIG. 3 provides a block diagram illustrating the user's mobile device of FIG. 2 in accordance with various embodiments of the invention.

FIG. 3 provides a block diagram illustrating the mobile device 300 of FIG. 2 in more detail, in accordance with embodiments of the invention. In one embodiment of the invention, the mobile device 300 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices 300 may include portable digital assistants (PDAs), pagers, mobile televisions, gaming devices, laptop computers, cameras, video recorders, audio/video player, radio, GPS devices, or any combination of the aforementioned.

The mobile device 300 generally includes a processor 310 communicably coupled to such devices as a memory 320, user output devices 336, user input devices 340, a network interface 360, a power source 315, a clock or other timer 350, a camera 380, and a positioning system device 375. In an embodiment, the network interface 360 includes a Near Field Communication device capable of communicating with other NFC enabled devices. The NFC device is capable of short range wireless transfer of data. In some embodiments, the range of the NFC signal is intentionally reduced such that the NFC signal is unlikely to be accessible to any NFC devices other than the NFC device that the user touches with the mobile device. In some embodiments, the NFC device generates a radio frequency (RF) field that is capable of powering another NFC device. In one embodiment, the NFC device on the mobile device is powered, such as by the power source for the mobile device or by a dedicated power source. In another embodiment, the NFC device on the mobile device is not powered and receives power from the NFC device associated with the point-of-sale device. In a still further embodiment, both the NFC device on the mobile device and the NFC device on the point-of-sale device are actively powered. In an embodiment, the NFC device on the mobile device does not need to be paired with the NFC device at the point-of-sale prior to transferring data. In some embodiments, the NFC device encrypts the data prior to transferring the data.

The processor 310 and other processors described herein generally include circuitry for implementing communication and/or logic functions of the mobile device 300. For example, the processor 310 may include a digital signal processor device, a microprocessor device, and various analog to digital converters, digital to analog converters, and/or other support circuits. Control and signal processing functions of the mobile device 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the mobile device 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 250. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless telephone network 252. In this regard, the mobile device 300 may be configured to operate with one or more air interface standards, communication protocols, modulation types, and access types. By way of illustration, the mobile device 300 may be configured to operate in accordance with any of a number of first, second, third, and/or fourth-generation communication protocols and/or the like. For example, the mobile device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 300 may also be configured to operate in accordance with non-cellular communication mechanisms, such as via a wireless local area network (WLAN), Bluetooth™ network, or other communication/data networks.

The network interface 360 may also include a payment network interface 370. The payment network interface 370 may include software, such as encryption software, and hardware, such as a modem, for communicating information to and/or from one or more devices on the network 250. For example, the mobile device 300 may be configured so that it can be used as a credit or debit card by, for example, wirelessly communicating account numbers or other authentication information to a terminal of the network 250.

As described above, the mobile device 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310. The user input devices 340, which allow the mobile device 300 to receive data from a user such as the user 210, may include any of a number of devices allowing the mobile device 300 to receive data from a user, such as a keypad, keyboard, touch-screen, touchpad, microphone, mouse, joystick, other pointer device, button, soft key, and/or other input device(s). The user interface may also include a camera 380, such as a digital camera.

The mobile device 300 may also include the positioning system device 375 that is configured to be used by a positioning system to determine a location of the mobile device 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate location of the mobile device 300. In other embodiments, the positioning system device 375 includes a proximity sensor or transmitter, such as an RFID tag, that can sense or be sensed by devices known to be located proximate a merchant or other location to determine that the consumer mobile device 300 is located proximate these known devices.

The mobile device 300 further includes a power source 315, such as a battery, for powering various circuits and other devices that are used to operate the mobile device 300. Embodiments of the mobile device 300 may also include a clock or other timer 350 configured to determine and, in some cases, communicate actual or relative time to the processor 310 or one or more other devices.

The mobile device 300 also includes the memory 320 operatively coupled to the processor 310. As used herein, memory includes any computer readable medium (as defined herein below) configured to store data, code, or other information. The memory 420 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the mobile device 300 described herein. For example, the memory 320 may include such applications as a conventional web browser application 322, an SMS (text) application 323, an email application 324, and/or a mobile wallet client application 321. These applications also typically provide a graphical user interface (GUI) on the display 330 that allows the user 210 to communicate with the user's mobile device 300, the banking system 500, and/or other devices or systems. In one embodiment of the invention, when the user 210 decides to enroll in the mobile banking program, the user 210 downloads or otherwise obtains the mobile banking system client application from the banking system 500 or from a distinct application server. In other embodiments of the invention, the user 210 interacts with the banking system 500 via the web browser application 322 in addition to, or instead of, the mobile wallet client application 321.

The memory 320 can also store any of a number of pieces of information, and data, used by the mobile device 300 and the applications and devices that make up the mobile device 300 or are in communication with the mobile device 300 to implement the functions of the mobile device 300 and/or the other systems described herein. For example, the memory 320 may include such data as user authentication information, etc.

Figure 4:
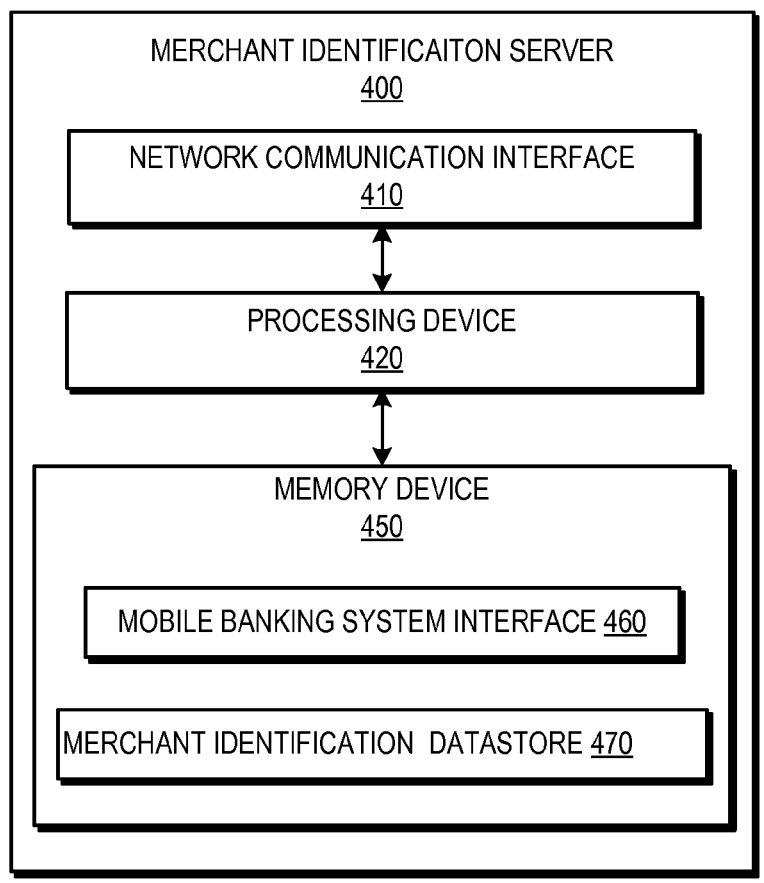
FIG. 4 provides a block diagram illustrating the merchant identification server of FIG. 2, in accordance with various embodiments of the invention.

FIG. 4 provides a block diagram illustrating a merchant identification server 400 of FIG. 2, in accordance with an embodiment of the invention. In one embodiment of the invention, the merchant identification server 400 is operated by a second entity that is a different or separate entity from the first entity (e.g., the financial institution) that, in one embodiment of the invention, implements the banking system 500. In one embodiment, the merchant identification server 400 could be part of the banking system 500. In another embodiment, the merchant identification server 400 is a distinct entity from the banking system 500. As illustrated in FIG. 4, the merchant identification server 400 generally includes, but is not limited to, a network communication interface 410, a processing device 420, and a memory device 450. The processing device 420 is operatively coupled to the network communication interface 410 and the memory device 450. In one embodiment of the merchant identification server 400, the memory device 450 stores, but is not limited to, a mobile banking system interface 460 and a merchant identification datastore 470. The merchant identification datastore 470 stores data including, but not limited to, transaction data associated with accounts of the user 210, identification data, user preferences, and the like. In one embodiment of the invention, both the mobile banking system interface 460 and the merchant identification datastore 470 may associate with applications having computer-executable program code that instructs the processing device 420 to operate the network communication interface 410 to perform certain communication functions involving the merchant identification datastore 470 described herein. In one embodiment, the computer-executable program code of an application associated with the merchant identification datastore 470 may also instruct the processing device 420 to perform certain logic, data processing, and data storing functions of the application associated with the merchant identification data store 470 described herein.

The network communication interface 410 is a communication interface having one or more communication devices configured to communicate with one or more other devices on the network 250. The processing device 420 is configured to use the network communication interface 410 to receive information from and/or provide information and commands to the user's mobile device 300, third party's systems 270, the merchant identification server 400, the banking system 500, and/or other devices via the network 250. In some embodiments, the processing device 420 also uses the network communication interface 410 to access other devices on the network 250, such as one or more web servers of one or more third-party data providers. In some embodiments, one or more of the devices described herein may be operated by a second entity so that the third-party controls the various functions involving the merchant identification server 400. For example, in one embodiment of the invention, although the banking system 500 is operated by a first entity (e.g., a financial institution), a second entity operates the merchant identification server 400 that monitors transaction data and transfers funds.

As described above, the processing device 420 is configured to use the network communication interface 410 to gather data from the various data sources. The processing device 420 stores the data that it receives in the memory device 450. In this regard, in one embodiment of the invention, the memory device 450 includes datastores that include, for example: (1) transaction data, (2) algorithms for identifying mobile payments, (3) identification data associated with merchants, (4) information about sending and receiving users' mobile device numbers, email addresses, customer support phone numbers, or other contact information, which may have been received from the banking system 500; and/or (5) a list of user IDs or authentication data received from the banking system 500.

In some embodiments of the invention, the merchant identification server 400 is configured to be controlled and managed by one or more third-party data providers (not shown in FIG. 2) over the network 250. In other embodiments, the merchant identification server 400 is configured to be controlled and managed over the network 250 by the same entity that maintains the financial institution's banking system. In other embodiments, the merchant identification server 300 is configured to be controlled and managed over the network 250 by the financial institution implementing the mobile payment system of the present invention. In still other embodiments, the merchant identification server 400 is a part of the banking system 500.

Figure 5:
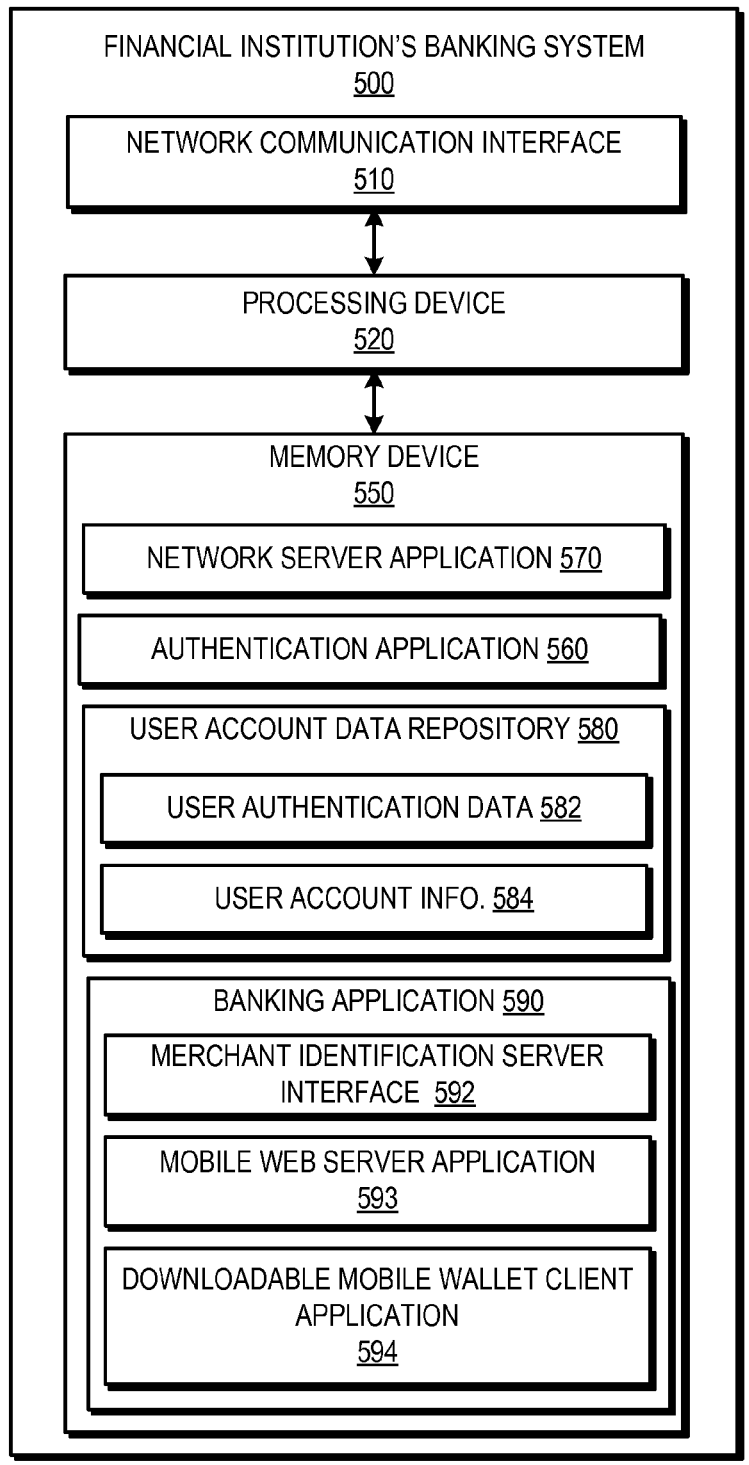
FIG. 5 provides a block diagram illustrating the financial institution's banking system of FIG. 2, in accordance with various embodiments of the invention.

FIG. 5 provides a block diagram illustrating the banking system 500 of FIG. 2 in greater detail, in accordance with embodiments of the invention. As illustrated in FIG. 5, in one embodiment of the invention, the banking system 500 includes a processing device 520 operatively coupled to a network communication interface 510 and a memory device 550. In certain embodiments, the banking system 500 is operated by a first entity, such as a financial institution, while in other embodiments the banking system 500 is operated by an entity other than a financial institution.

It should be understood that the memory device 550 may include one or more databases or other data structures/repositories. The memory device 550 also includes computer-executable program code that instructs the processing device 520 to operate the network communication interface 510 to perform certain communication functions of the banking system 500 described herein. For example, in one embodiment of the banking system 500, the memory device 550 includes, but is not limited to, a network server application 570, an authentication application 560, a user account data repository 580, which includes user account data 582 and user account information 584, a banking application 590, which includes a merchant identification interface 592, a mobile web server application 593, a downloadable mobile wallet client application 594, and other computer-executable instructions or other data. In some embodiments the banking application 590 comprises a mobile web server application 593 that allows the user to change user preferences. The computer-executable program code of the network server application 570, the authentication application 560, or the banking application 590 may instruct the processing device 520 to perform certain logic, data-processing, and data-storing functions of the banking system 500 described herein, as well as communication functions of the banking system 500.

In one embodiment, the user account data repository 580 includes user authentication data 582 and user account information 584. The network server application 570, the authentication application 560, and the banking application 590 are configured to implement user account information 584 in collaboration with the user authentication data 582 and the merchant identification interface 592 when authenticating the user 210 to the banking system 500.

As used herein, a "communication interface" generally includes a modem, server, transceiver, and/or other device for communicating with other devices on a network, and/or a user interface for communicating with one or more users. Referring again to FIG. 5, the network communication interface 510 is a communication interface having one or more communication devices configured to communicate with one or more other devices on the network 250, such as the mobile device 300, the banking system 500, the other financial institution banking systems 270, and the merchant identification server 400. The processing device 520 is configured to use the network communication interface 510 to transmit and/or receive data and/or commands to and/or from the other devices connected to the network 250.

Figure 6A:
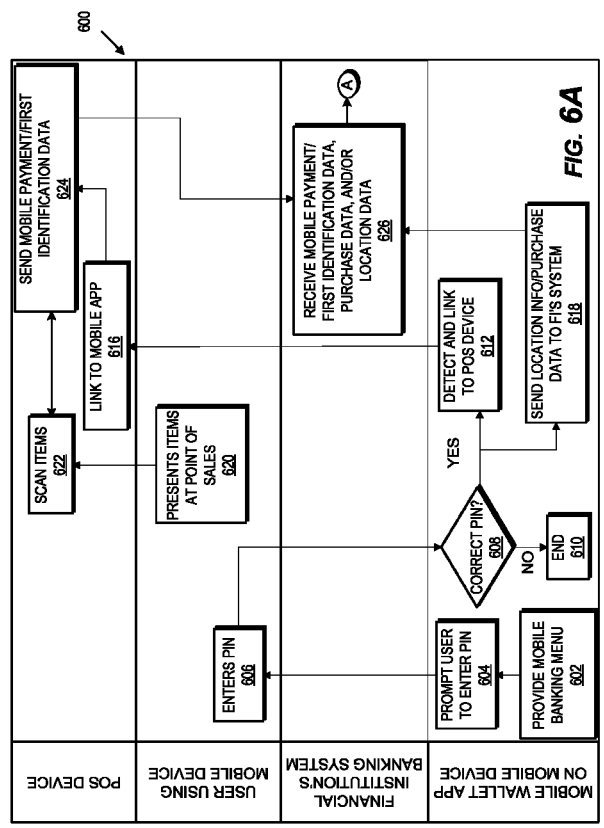
FIG. 6A is a flowchart illustrating a merchant reconciliation process in accordance with various embodiments of the invention.
Figure 6B:
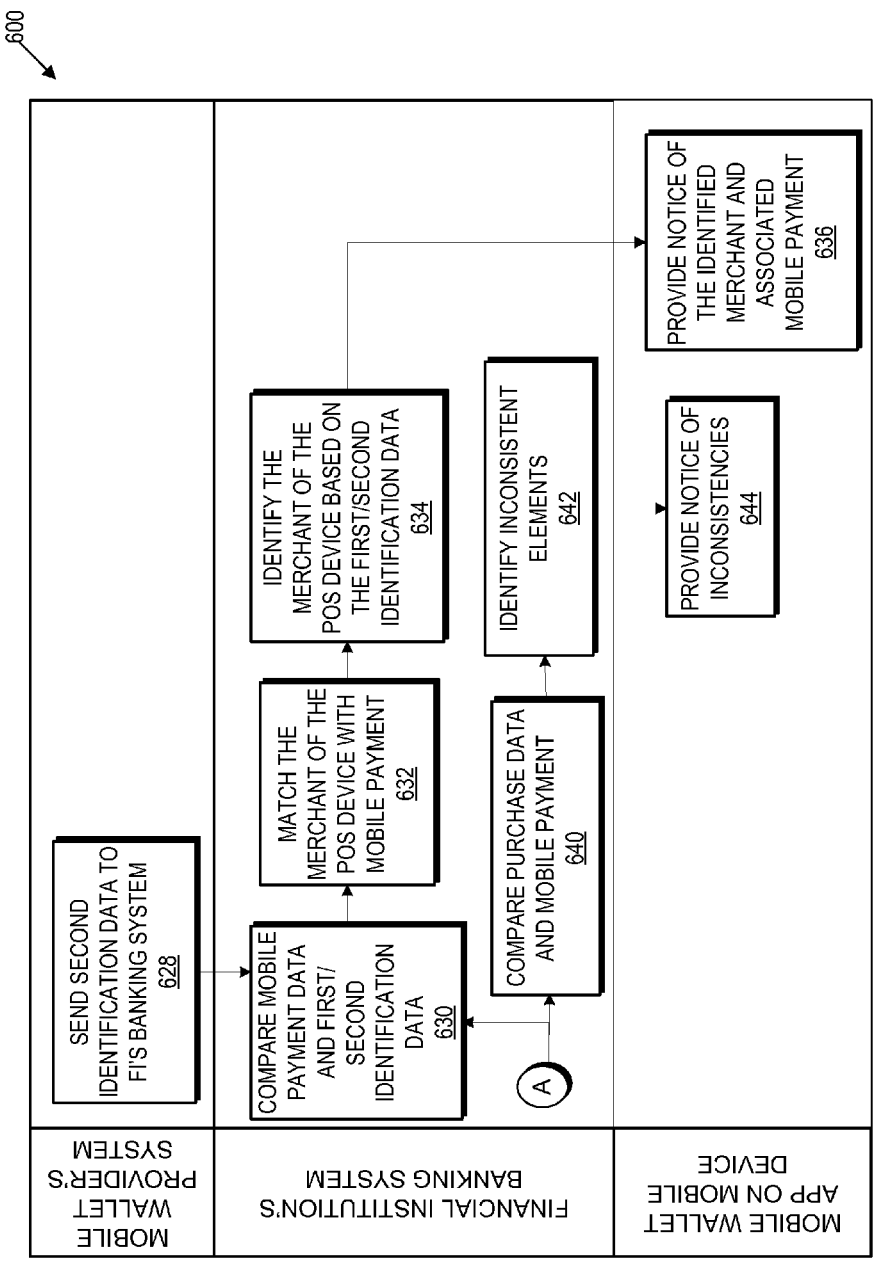
FIG. 6B is a continuation of the flowchart from FIG. 6A illustrating a merchant reconciliation process in accordance with various embodiments of the invention.

Referring now to FIGS. 6A-6B, flowcharts illustrating a merchant reconciliation process are provided. As illustrated in block 602 of FIG. 6A, a mobile wallet application on a mobile device of a user (e.g., the user's mobile device 300) provides a mobile banking menu. As illustrated at block 604, the mobile wallet application prompts the user to enter a PIN, such as a code of numbers, letters, and/or symbols. A user using the mobile device enters the PIN in a designated field as shown in block 606. In some embodiments, the mobile wallet application is configured to present multiple authentication procedures to the user. For example, the user may be asked to enter a second code before the user can initiate a mobile payment.

As illustrated at block 608, the mobile wallet application determines if the PIN is correct. In some embodiments, the mobile wallet application communicates with the financial institution's banking system in order to determine if the PIN or other authentication process is correct. The mobile wallet application ends the process if the PIN is incorrect (block 610). If the PIN is correct, the mobile wallet application detects and links to a POS device as shown in block 612. The mobile wallet application may use a geo-positioning device stored in the mobile device to determine the location of the mobile device and send location data to the POS device. In some embodiments, the mobile wallet application is set up to automatically detect the POS device through NFC or wireless technologies. In other embodiments, a user uses the mobile device to scan a QR code at the POS device in order to link to the POS device. As illustrated at block 616, the POS device links to the mobile device. In still other embodiments, a financial institution's banking system lists all payment vehicles available to the mobile wallet application if the PIN is correct. The user can select a particular payment vehicle such as a credit card account or debit card account to complete the transaction.

In block 618, the mobile wallet application sends location information and/or purchase data to the financial institution's system. The locations information, in some embodiments, is generated by a GPS device of the mobile device that is in communication with the financial institution's banking system. The purchase data includes user defined information and purchase related information as described hereinabove. The user, for example, may input purchase data in fields provided by the mobile wallet application. In additional embodiments, the user scans a QR code provided by the merchant at the point of sale or at some other location using a camera of the mobile device. The QR code is then received by the financial institution's banking system. In other embodiments, an image of a logo of a merchant is sent from the mobile device and received by the financial institution's banking system.

As illustrated at block 620, the user presents items for purchase at the point of sale. In some embodiments, the user uses the mobile wallet application to scan the products that the user intends to purchase (e.g., using a bar code reader or camera) when the user navigates through the store. In this way, the mobile wallet application receives product data directly. As illustrated at block 622, the POS device scans the items. As the products are scanned, the POS device sends transaction data and/or first identification data to the financial institution's banking system as shown in block 624. In other embodiments, the POS device sends the transaction data and/or first identification data to the mobile wallet application. As illustrated at block 626, the banking system receives the transaction data and/or first identification data from the POS device and/or receives the location information and/or purchase data from the mobile wallet application. The transaction data received from the POS device in the illustrated embodiment comprises mobile payment data. In some embodiments, some or all of the actions performed by the financial institution's banking system in FIGS. 6A-6B can also be performed by a merchant identification server (e.g., the server 400).

Referring now to FIG. 6B, the process 600 is further illustrated. As illustrated at block 628, the mobile wallet provider's system sends second identification data to the financial institution's banking system. In some embodiments, at least a portion of the second identification data is different from at least a portion of the first identification data. In other embodiments, the first identification data is the same as the second identification data. As illustrated in block 630, the financial institution's banking system compares mobile payment data and the first identification data and/or second identification data. The financial institution's banking system, in some embodiments, identifies the mobile payment data based on the transaction data.

As illustrated at block 632, the financial institution's banking system matches the merchant of the POS device with the mobile payment. In the illustrated embodiment of FIGS. 6A-6B, the transaction data received by the financial institution's banking system designates the mobile wallet provider as the merchant of record. The merchant of the POS device is an unrecorded merchant that is not designated as being associated with the mobile payment in the transaction data. As shown in block 634, the financial institution's banking system identifies the merchant of the POS device based on the first identification data and/or second identification data. The financial institution's banking system sends the identity of the merchant to the mobile device and the mobile wallet application provides notice of the identified merchant and associated mobile payment as shown in block 636. The notice may also be included, for example, in a paper statement and/or a statement provided in the user's online banking account.

As illustrated at block 640, the financial institution's banking system compares the purchase data and the mobile payment of the transaction data. As illustrated at block 642, the financial institution's banking system identifies inconsistencies between the purchase data and the mobile payment. The mobile wallet application provides notice of the inconsistencies as shown in block 644. For example, the mobile wallet application may display mismatched transaction times, inconsistent merchant identities, and other inconsistencies on the display of the mobile device. In one example, the user may select a correct element, such as the actual merchant, from the displayed inconsistent merchant identities. In another example, the user may enter additional information such as a modified merchant identity or transaction amount using the mobile wallet application.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for reconciling merchants of record in a mobile wallet feature, the system comprising:
   a computer apparatus including a processor and a memory; and
   a merchant identification software module stored in the memory, comprising executable instructions that when executed by the processor cause the processor to:
   receive transaction data comprising identification data of an unrecorded merchant that is a party to one or more transactions from a mobile device that is in communication with the system, the identification data comprising quick response code associated with the unrecorded merchant or an image of a logo associated with the unrecorded merchant;

identify mobile payments based on the transaction data, the mobile payments comprising a merchant of record, wherein the merchant of record comprises a provider of the mobile wallet feature, and wherein the merchant of record is not a party to the one or more transactions;

compare the mobile payments and the quick response code or the image of the logo of the unrecorded-merchant;

match the quick response code or the image of the logo with at least one payment of the mobile payments in response to the comparison of the mobile payments and the quick response code or the image of the logo;

identify the unrecorded merchant based on the quick response code or the image of the logo; and replace the merchant of record with the identified unrecorded merchant in a notification of the mobile payments.

2. The system of claim 1, wherein the module is further configured to:

receive purchase data from a user;
compare the purchase data and the at least one payment;
identify inconsistencies between the purchase data and the at least one payment; and
notify the user of the inconsistencies.

3. The system of claim 2, wherein the module is further configured to:

identify a purchase trend based on the transaction data;
compare the purchase trend and the at least one payment; and
identify inconsistencies between the purchase trend and the at least one payment.

4. The system of claim 1, wherein the module is further configured to:

provide a notification to a user, wherein the notification comprises the at least one payment and the identified unrecorded merchant.

5. The system of claim 1, wherein the identification data of the unrecorded merchant is received from the provider of the mobile wallet feature, the unrecorded merchant, or from a user.

6. The system of claim 1, wherein the identification data comprises first identification data received from the provider of the mobile wallet feature and second identification data received from the unrecorded merchant.

7. The system of claim 6, wherein the module is further configured to:

receive account data from the unrecorded merchant;
compare the second identification data and the account data of the unrecorded merchant; and
determine the identity of the unrecorded merchant in response to the comparison of the second identification data and the account data.

8. The system of claim 1, wherein the module is further configured to:

receive location information of a mobile device that is in communication with the system;
determine the period of time associated with the location information;
identify at least one transaction of the mobile payments that occur during the period of time; and
identify one or more merchants associated with the location information, wherein the one or more merchants is a party to the at least one transaction.

9. A computer program product for reconciling merchants of record in a mobile wallet feature, the computer program product comprising:

a computer readable non-transitory storage medium having computer readable program code embodied therewith, the computer readable non-transitory storage medium comprising:

a computer readable program code configured to receive transaction data comprising identification data of an unrecorded merchant that is a party to one or more transactions from a mobile device, the identification data comprising quick response code associated with the unrecorded merchant or an image of a logo associated with the unrecorded merchant;

a computer readable program code configured to identify mobile payments based on the transaction data, the mobile payments comprising a merchant of record, wherein the merchant of record comprises a provider of the mobile wallet feature, and wherein the merchant of record is not a party to the one or more transactions;

a computer readable program code configured to compare the mobile payments and the quick response code or the image of the logo of the unrecorded merchant;

a computer readable program code configured to match the quick response code or the image of the logo with at least one payment of the mobile payments in response to the comparison of the mobile payments and the quick response code or the image of the logo;

a computer readable program code configured to identify the unrecorded merchant based on the quick response code or the image of the logo; and a computer readable program code configured to replace the merchant of record with the identified unrecorded merchant in a notification of the mobile payments.

10. The computer program product of claim 9, the computer program product further comprising a computer readable program code configured to receive location information of a mobile device that is in communication with the system; to determine the period of time associated with the location information; to identify at least one transaction of the mobile payments that occur during the period of time; and to identify one or more merchants associated with the location information, wherein the one or more merchants is a party to the at least one transaction.

11. The computer program product of claim 9, the computer program product further comprising a computer readable program code configured to receive purchase data from a user; to compare the purchase data and the at least one payment; to identify inconsistencies between the purchase data and the at least one payment; and to notify the user of the inconsistencies.

12. The computer program product of claim 9, the computer program product further comprising a computer readable program code configured to identify a purchase trend based on the transaction data; compare the purchase trend and the at least one payment; and identify inconsistencies between the purchase trend and the at least one payment.

13. The computer program product of claim 9, the computer program product further comprising a computer readable program code configured to provide a notification to a user, the notification comprises the at least one payment and the identified unrecorded merchant.

14. The computer program product of claim 9, wherein the identification data comprises first identification data received from the provider of the mobile wallet feature and second identification data received from the unrecorded merchant.

15. A method for reconciling merchants of record in a mobile wallet feature, the method comprising:

receiving transaction data comprising identification data of an unrecorded merchant that is a party to one or more transactions from a mobile device, the identification data comprising quick response code associated with the unrecorded merchant or an image of a logo associated with the unrecorded merchant;

identifying, via a computing device processor, mobile payments based the transaction data, the mobile payments comprising a merchant of record, wherein the merchant of record comprises a provider of the mobile wallet feature, and wherein the merchant of record is not a party to the one or more transactions;

comparing, via a computing device processor, the mobile payments and the quick response code or the image of the logo of the unrecorded merchant;

matching, via a computing device processor, the quick response code or the image of the logo with at least one payment of the mobile payments in response to the comparison of the mobile payments and the quick response code or the image of the logo;

identifying, via a computing device processor, the unrecorded merchant based on the quick response code or the image of the logo; and replacing, via a computing device processor, the merchant of record with the identified unrecorded merchant in a notification of the mobile payments.

16. The method of claim 15, the method further comprising:

receiving purchase data from a user;

comparing, via a computing device processor, the purchase data and the at least one payment; and identifying, via a computing device processor, inconsistencies between the purchase data and the at least one payment; and notifying, via a computing device processor, the user of the inconsistencies.

17. The method of claim 15, the method further comprising;

receiving account data from the unrecorded merchant;

comparing, via a computing device processor, the second identification data and account data of the unrecorded merchant;

determining, via a computing device processor, the identity of the unrecorded merchant in response to the comparison of the second identification data and the account data; and matching, via a computing device processor, the identified unrecorded merchant with at least one of the mobile payments.

18. The method of claim 15, the method further comprising:

receiving location information of a mobile device that is in communication with the system;

determining, via a computing device processor, the period of time associated with the location information;

identifying, via a computing device processor, at least one transaction of the mobile payments that occur during the period of time;

identifying, via a computing device processor, one or more merchants associated with the location information, wherein the one or more merchants is a party to the at least one transaction.

19. A system for reconciling merchants of record in a mobile wallet feature, the system comprising:

a computer apparatus including a processor and a memory; and a merchant identification software module stored in the memory, comprising executable instructions that when executed by the processor cause the processor to:

receive transaction data comprising identification data of an unrecorded merchant that is a party to one or more transactions;

identify mobile payments based on the transaction data, the mobile payments comprising a merchant of record, wherein the merchant of record comprises a provider of the mobile wallet feature and wherein the merchant of record is not a party to the one or more transactions;

compare the mobile payments and the identification data of the unrecorded merchant;

receive first location information associated with the one or more transactions and second location information associated with the one or more transactions, the second location information comprising a single address;

determine that no merchants are located in a first geographical area associated with the first location information and identify at least one proximate merchant located closest in distance to the first geographical area;

identify multiple merchants located in a second geographical area corresponding to the single address and identify a subset of possible merchants from the multiple merchants in the second geographical area based on the transaction data;

compare the mobile payments and the at least one proximate merchants and compare the mobile payments and the possible merchants;

match the at least one proximate merchant with at least one first payment of the mobile payments and match at least one of the possible merchants with at least one second payment of the mobile payments in response to the comparison of the mobile payments and the identification data;

identify the unrecorded merchant based on the identification data; and replace the merchant of record with the identified unrecorded merchant in a notification of the mobile payments.

* * * * *